(12) United States Patent
Anderson et al.

(10) Patent No.: US 10,291,415 B2
(45) Date of Patent: May 14, 2019

(54) EMBEDDED EXTENSIBLE INSTRUMENTATION BUS

(71) Applicants: Bosch Automotive Service Solutions Inc., Warren, MI (US); Robert Bosch GmbH, Stuttgart (DE)

(72) Inventors: Frank E. Anderson, Santa Barbara, CA (US); Bernd Heppner, Schwieberdingen (DE)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 648 days.

(21) Appl. No.: 14/717,210

(22) Filed: May 20, 2015

(65) Prior Publication Data

US 2015/0339252 A1    Nov. 26, 2015

Related U.S. Application Data

(60) Provisional application No. 62/000,877, filed on May 20, 2014.

(51) Int. Cl.
  *H04L 9/38*    (2006.01)
  *H04L 9/32*    (2006.01)
(52) U.S. Cl.
  CPC .............. *H04L 9/38* (2013.01); *H04L 9/3226* (2013.01)
(58) Field of Classification Search
  CPC .............................. H04L 9/3226; H04L 9/38

USPC ............................................................ 710/8
See application file for complete search history.

(56) References Cited

U.S. PATENT DOCUMENTS

| | | | | |
|---|---|---|---|---|
| 6,564,340 | B1 * | 5/2003 | Odegard | G06F 13/409 710/316 |
| 8,063,838 | B1 * | 11/2011 | Tonn | H01Q 1/34 343/709 |
| 2002/0174264 | A1 * | 11/2002 | Fuller | G06F 9/4411 719/321 |
| 2006/0072545 | A1 * | 4/2006 | Tufford | G06F 13/4081 370/352 |
| 2013/0079236 | A1 * | 3/2013 | Holmes | G01N 33/50 506/9 |
| 2014/0234949 | A1 * | 8/2014 | Wasson | G01N 35/1065 435/287.2 |
| 2014/0308661 | A1 * | 10/2014 | Holmes | G01N 35/00 435/6.1 |
| 2017/0336383 | A1 * | 11/2017 | Troxler | G01N 33/42 |

* cited by examiner

*Primary Examiner* — Benjamin P Geib
*Assistant Examiner* — Getente A Yimer
(74) *Attorney, Agent, or Firm* — Maginot Moore & Beck LLP

(57) ABSTRACT

A method of configuring a controller for communication with at least one instrument module includes electrically connecting an interface of the at least one instrument module to an interface of the controller, receiving with the controller an identification signal from the interface of the at least one instrument module through a portion of the interface of the controller, and executing with the controller a configuration program that corresponds to the identification signal to enable communication between the at least one instrument module and the controller.

16 Claims, 7 Drawing Sheets

EMBEDDED EXTENSIBLE INSTRUMENTATION BUS

This application claims the benefit of priority of U.S. provisional application Ser. No. 62/000,877, filed on May 20, 2014, the disclosure of which is herein incorporated by reference in its entirety.

FIELD

This disclosure relates to modular instrumentation systems and in particular to an upgradable modular instrumentation system including an embedded extensible instrumentation bus.

BACKGROUND

The typical modular instrumentation system includes a mainframe (also referred to as a chassis) that interfaces with a computer. The mainframe defines numerous card slots that are connected by an instrumentation bus to the computer. Each card slot is configured to receive an instrument module, which is a hardware device configured to collect sensor data, for example. The instrument modules are typically 6U in height and C-size (unlike VME bus modules which are more commonly B-size). The instrumentation bus is configured to facilitate the transfer of the sensor data between the instrument modules and the computer. Based on the type of instrument modules installed in the mainframe, the instrumentation system is configurable to meet a particular requirement or perform a particular function. Thus, the modular instrumentation system is an alternative to interfacing numerous standalone instruments with the computer.

The current state-of-the-art for instrumentation systems includes instrumentation busses utilizing the Versa Module Europa eXtenstions Instrumentation (VXI) and the General Purpose Interface Bus (GPIB and IEEE 488) architectures. The VXI bus architecture is an open standard platform for automated testing based upon an earlier standard referred to as VMEbus. VXI provides additional bus lines, as compared to VMEbus, for timing and triggering as well as mechanical requirements and standard protocols for configuration, message-based communication, multi-chassis extension, and other features. In 2004, an extension referred to as 2eVME was added to the VXI bus specification, giving it a maximum data rate of 160 MB/s.

IEEE-488 is a short-range digital communications bus specification. IEEE-488 is an interface bus between modules as opposed to an interface bus within a larger mainframe structure. It was produced in the late 1960s for use with automated test equipment, and is still in use for that purpose. IEEE-488 was structured as a HP-IB (Hewlett-Packard Interface Bus). The IEEE-488 bus provides data as 8-bit, parallel data. The bus employs sixteen signal lines, with eight signal lines used for bi-directional data transfer, three signal lines for handshake, and five signal lines for bus management. An additional eight signal lines are included for ground return lines. The devices on the bus have a unique 5-bit primary address, limited to the range of zero to thirty, enabling up to thirty-one total possible addresses. The standard allows up to fifteen devices to share a single physical bus of up to twenty meters total cable length. The physical topology can be linear or star (forked). Active extenders allow longer buses, with up to thirty-one devices theoretically possible on a logical bus. Control and data transfer functions are logically separated; a controller can address one device as a "talker" and one or more devices as "listeners" without having to participate in the data transfer. Multiple controllers may share the same bus; but only one can be the "Controller In Charge" at a time. In the original IEEE-488 protocol, transfers used an interlocked, three-wire ready-valid-accepted handshake. The maximum data rate is about one megabyte per second. The later HS-488 extension relaxes the handshake requirements, enabling communication at rates up to 8 Mbyte/s. The slowest participating device determines the speed of the bus.

Both IEEE-488 and VXI have hardware overheads that make any instrumentation systems based on them expensive, since each instrument module must carry the overhead of a complex bus architecture. Thus, further developments for the instrumentation bus of a modular instrumentation system are desirable.

SUMMARY

According to an exemplary embodiment of the disclosure, a method of configuring a controller for communication with at least one instrument module includes electrically connecting an interface of the at least one instrument module to an interface of the controller, receiving with the controller an identification signal from the interface of the at least one instrument module through a portion of the interface of the controller, and executing with the controller a configuration program that corresponds to the identification signal to enable communication between the at least one instrument module and the controller.

According to another exemplary embodiment of the disclosure, an instrumentation system at least one instrument module having an interface, and a controller having an interface configured for electrical connection to the interface of the at least one instrument module. The controller is configured to receive an identification signal generated by the at least one instrument module and communicated through a predetermined portion of the interface of the controller and the interface of the at least one instrument module, and to execute a configuration program that corresponds to the identification signal to enable communication between the at least one instrument module and the controller through a remainder of the interface of the controller and the interface of the at least one instrument module.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
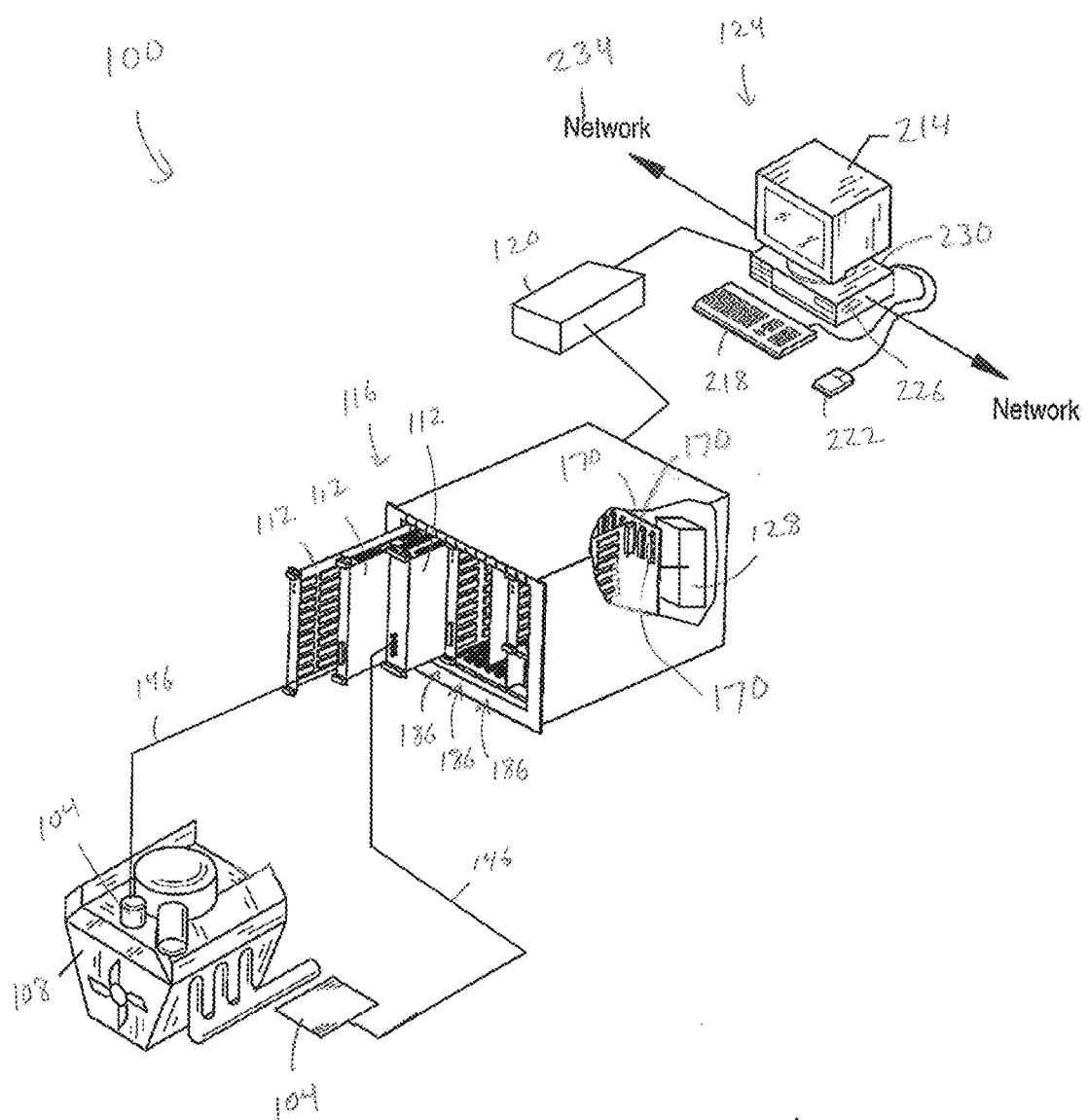
FIG. 1 is a block diagram of an upgradable instrumentation system including a computer, a mainframe, and a product being tested, the mainframe includes a controller having an embedded extensible instrumentation bus (EXIB) and three instrument modules.

For the purpose of promoting an understanding of the principles of the disclosure, reference is now made to the embodiments illustrated in the drawings and described in the following written specification. No limitation to the scope of the disclosure is intended by reference to these particular embodiments. This disclosure also includes any alterations and modifications to the illustrated embodiments and includes further applications of the principles of the disclosure as would normally occur to one skilled in the art to which this disclosure pertains.

As shown in FIG. 1, an upgradable instrumentation system 100 includes two test instruments 104 for testing a device 108, three instrument modules 112, a mainframe 116 configured to receive the instrument modules 112, a data acquisition card 120, and a computer 124. As described herein, the mainframe 116 includes a controller 128 that is automatically configured for communication with the instrument modules 112 and any other instrument module received by the mainframe 116. Thus, the instrumentation system 100 is a versatile, adaptable, and easy to use system. The mainframe 116 includes a plurality of module slots 186, each of which is configured to receive an instrument module. Each module slot includes one interface 170 of the controller 128, which is described in more detail below.

The computer 124 includes a display 214, input peripherals depicted as a keyboard 218 and a mouse 222 in the figure, and an electronic memory 226 connected to a CPU unit 230. In the illustrated embodiment, the computer 124 is electrically connected to the data acquisition card 120 which interfaces the computer 124 with the mainframe 116. The data acquisition card 120, in some embodiments, is located within the CPU unit 230. The computer 124 is configured to run programs (i.e. software) stored on non-transitory computer readable media, such as the memory 226. In one embodiment, the computer 124 is connected to the Internet, a local area network, or another type of computer network 234. In other embodiments, the computer 124 is provided as a tablet computer, a smart phone, or any other suitable device. In such an embodiment, the computer 124 is configured to support a communication connection to a cellular network.

The test instruments 104 are typically connected or associated with the device 108 under test, which is shown in FIG. 1 as an internal combustion engine. The test instruments 104, which are also referred to herein as sensors, are configured to generate signals corresponding to a property associated with the device 108. In particular, the test instruments 104 are configured to generate electronic test data associated with at least one sensed property. Exemplary test instruments 104 include an oscilloscope probe, a digital multimeter probe, a temperature sensor, a pressure sensor, a vacuum sensor, and a digital camera. Accordingly, exemplary sensed properties include temperature, pressure, voltage, current, inductance, capacitance, frequency, and the like. In addition to the exemplary test instruments 104 listed above, the test instruments 104 also include any other data generating sensor device.

Figure 2:
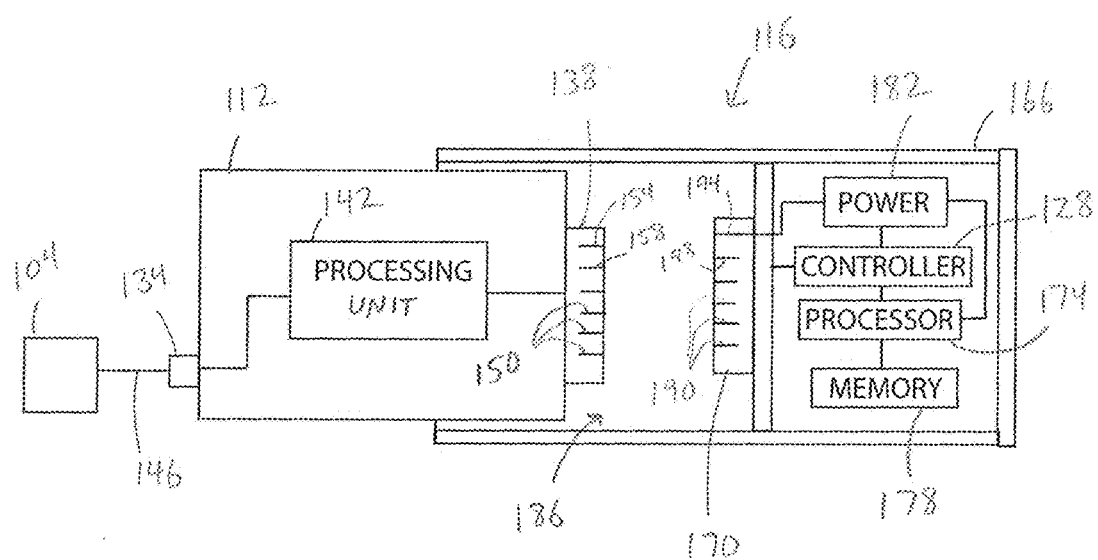
FIG. 2 is a block diagram of an instrument module and the mainframe of FIG. 1, showing an interface of the instrument module and an interface of a controller of the mainframe.

With reference to FIG. 2 an exemplary instrument module 112 is shown electrically disconnected from the mainframe 116. The instrument module 112 is configured to process the test data generated by a corresponding test instrument(s) 104 connected to the module. Moreover, the instrument module 112 is configured to send control data to the corresponding test instrument(s) 104 during a test procedure, for example. Exemplary instrument modules 112 are configured to operate as an oscilloscope (see FIG. 5), an output module (see FIG. 6), a digitizer, a digital multimeter (DMM), a counter, a power meter, a waveform generator, a D/A converter, a switch, an automated test device, a stimulus module, and the like.

The instrument module 112 of FIG. 2 includes a data connector 134 and an interface 138 both of which are electrically connected to a processing unit 142. The data connector 134 is any type of connector suitable for connecting the instrument module 112 to at least one test instrument 104, typically through an electrical conductor 146. The data connector 134 enables bi-directional data transfer between the instrument module 112 and the connected test instrument(s) 104. In one embodiment, the data connector 134 is provided as a BNC connector, but in other embodiments the data connector 134 is provided as any other suitable type of connector.

The interface 138 of the instrument module 112 is configured for bi-directional electronic data transfer between the instrument module 112 and the controller 128 of the mainframe 116. The interface 138 includes a plurality of electrical conductors 150 that are electrically connected to the processing unit 142. In one embodiment, the interface 138 includes thirty or fewer of the electrical conductors 150; however, in FIG. 2 only six of the electrical conductors 150 are illustrated. In the illustrated embodiment, one of the electrical conductors is predetermined to receive electrical power from the mainframe 116 and is designated with reference number 154. Another electrical conductor is predetermined to carry an identification signal generated by the instrument module 112 and is designated with the reference number 158. In one embodiment, each instrument module 112 includes an interface 138 having the predetermined power conductor 154 and the predetermined identification conductor 158 in the same physical location of the interface 138. The other conductors 150 of the interface 138 are configured to transfer data from the instrument module 112 to the mainframe 116 or to receive data from the mainframe 116, among other functions. In one embodiment, the other conductors 150 are user-definable or configurable to have a predetermined usage or function.

The processing unit 142 is configured to process the test data generated by the test instrument 104 and to configure the test data for transfer to the mainframe 116 through the interface 138. Moreover, the processing unit 142 processes data received by the instrument module 112 from the mainframe 116 through the interface 138. Depending on the embodiment, the processing unit 142 includes a processor operatively connected to an electronic memory as well as other electrical and electronic components.

With continued reference to FIG. 2, the mainframe 116 includes a housing 166 configured to at least partially contain a plurality of interfaces 170 (only one shown in FIG. 2), the controller 128, a processor 174, and a memory 178, each of which is supplied with electrical power from a power supply 182. The housing 166, which is also referred to herein as a rack, is configured to define a plurality of slots 186 (only one shown in FIG. 2). The slots 186 are sized and shaped to receive and to support at least one of the instrument modules 112. An exemplary housing 166 defines up to thirteen slots 186; however, the housing 166 is configurable to define any desired number of slots 186.

The interface 170 is electrically connected to the controller 128 and is also referred to herein as an interface of the controller. The interface 170 is configured for bi-directional electronic data transfer between the controller 128 and an instrument module 112 that is connected to the interface. One interface 170 is typically located at a back end of each slot 186. For example, in FIG. 1 one interface 170 is located at the back end of each slot 186. The interface 170 is also referred to herein as a slot connector. The description of the interface 170 provided in this document refers to each interface 170 in the mainframe 116.

As shown in FIG. 2, the interface 170 includes a plurality of electrical conductors 190 that are electrically connected to the controller 128. In one embodiment, the interface 170 includes thirty of the electrical conductors 190. In the illustrated embodiment, one of the conductors is predetermined to electrically couple to the power supply 182, which is designated with the reference number 194 in the figure, and is configured for electrical connection to the power conductor 154 of the interface 138 of the instrument module 112 to supply the instrument module 112 with electrical power. Also, in the illustrated embodiment, one of the conductors of the interface 170 is predetermined to electrically connect to the predetermined identification conductor 158 of the interface 138 of the instrument module 112 to enable the interface 170 to receive an identification signal from the instrument module connected to the interface. The remaining conductors 190 of the interface 170 are configured to transfer data from the controller 128 to the instrument module 112 and to receive data from the instrument module 112.

Figure 3:
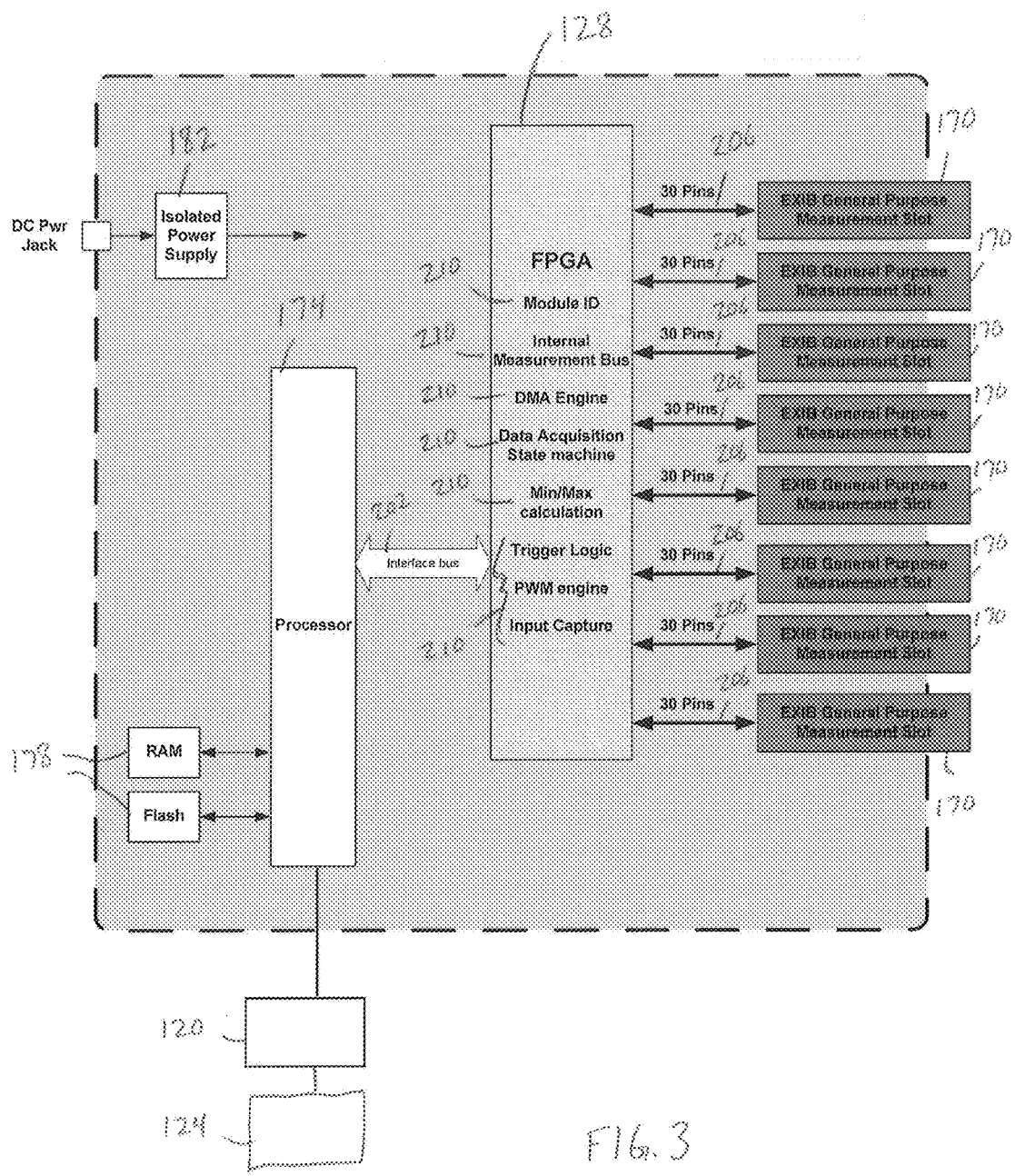
FIG. 3 is another block diagram of the mainframe of FIG. 1, showing interfaces of the controller, the controller, and a processor.

As shown in FIG. 3, the controller 128, which is also referred to herein as an embedded extensible instrumentation bus (EXIB), is electrically connected to each interface 170 and is electrically connected to the processor 174 through an interface bus 202. The controller 128, in one embodiment, includes or is provided as a field programmable gate array (FPGA). The controller 128 includes a plurality of configurable channel driver pins (I/O ports, signal lines) 206 and a plurality of configuration programs 210. The driver pins 206 are electrically connected to the interfaces 170 of the controller 128. In the exemplary embodiment of FIG. 3, the controller 128 includes two hundred forty driver pins 206, which are connected to the interfaces 170 in thirty pin groups. In another embodiment, the controller 128 is connected to the interfaces 170 indirectly via a multiplexer (not shown), a switch unit (see FIG. 7), or other device. In one embodiment, the controller 128 uses only those driver pins 206 that are necessary to manage the operation of a particular instrument module 112, thereby increasing the adaptability of the controller 128. For example, a particular instrument module 112 includes ten conductors 150 of the interface 138, and the controller 128 activates only the ten conductors 190 of the interface 170 required for communication with the instrument module 112 even though thirty conductors 190 are present at the interface 170.

The interfaces 170 of the controller 128 include fewer conductors 190 than a traditional bus. Moreover, the function and purpose of the conductors 190 are configurable on an as needed basis, and the function and purpose of the conductors 190 are typically different from interface 170 to interface 170. In one embodiment, the only fixed signals of the interface 170 are the predetermined power conductor 194 and the predetermined identification conductor 198.

The configuration programs 210 are programs configured to be executed by the controller 128 to enable the controller 128 to operate an instrument module 112 connected to the interface 170. Accordingly, the controller 128 is configured to facilitate data transfer between the microprocessor-based data acquisition system of the computer 124 and the signal capture and generation elements of the instrument modules 112. In the embodiment illustrated in FIG. 3, the controller 128 includes a configuration program 210 for each type of instrument module 112 that is connectable to the mainframe 116. For example, the controller 128 includes configuration programs 210 such as, module identification, internal measurement bus, direct memory access ("DMA") engine, data acquisition state machine, min/max calculation, trigger logic, pulse width modulation ("PWM") engine, and input capture. The controller 128 is programmable to include a configuration program 210 for any type of instrument module configured for installation in the mainframe 116.

In addition to facilitating communication between instrument modules 112 and the computer 124, the controller 128, in at least one embodiment, is configured to facilitate direct data transfer between the instrument modules 112, independent of the processor 174. During direct data transfer, the controller 128 receives data from a first instrument module 112 through a first interface 170 and transfers the data directly to a second instrument module 112 through a second interface 170 without transferring the data to the processor 174.

The processor 174 is electrically connected to the controller 128, the memory 178, and the data acquisition card 120 of the computer 124. The processor 174 is configured to process data received by the controller 128 through one of the interfaces 170 and to facilitate the transfer of data between the data acquisition card 120 and the controller 128. The processor 174 is provided as any desired type of electronic processor.

Figure 4:
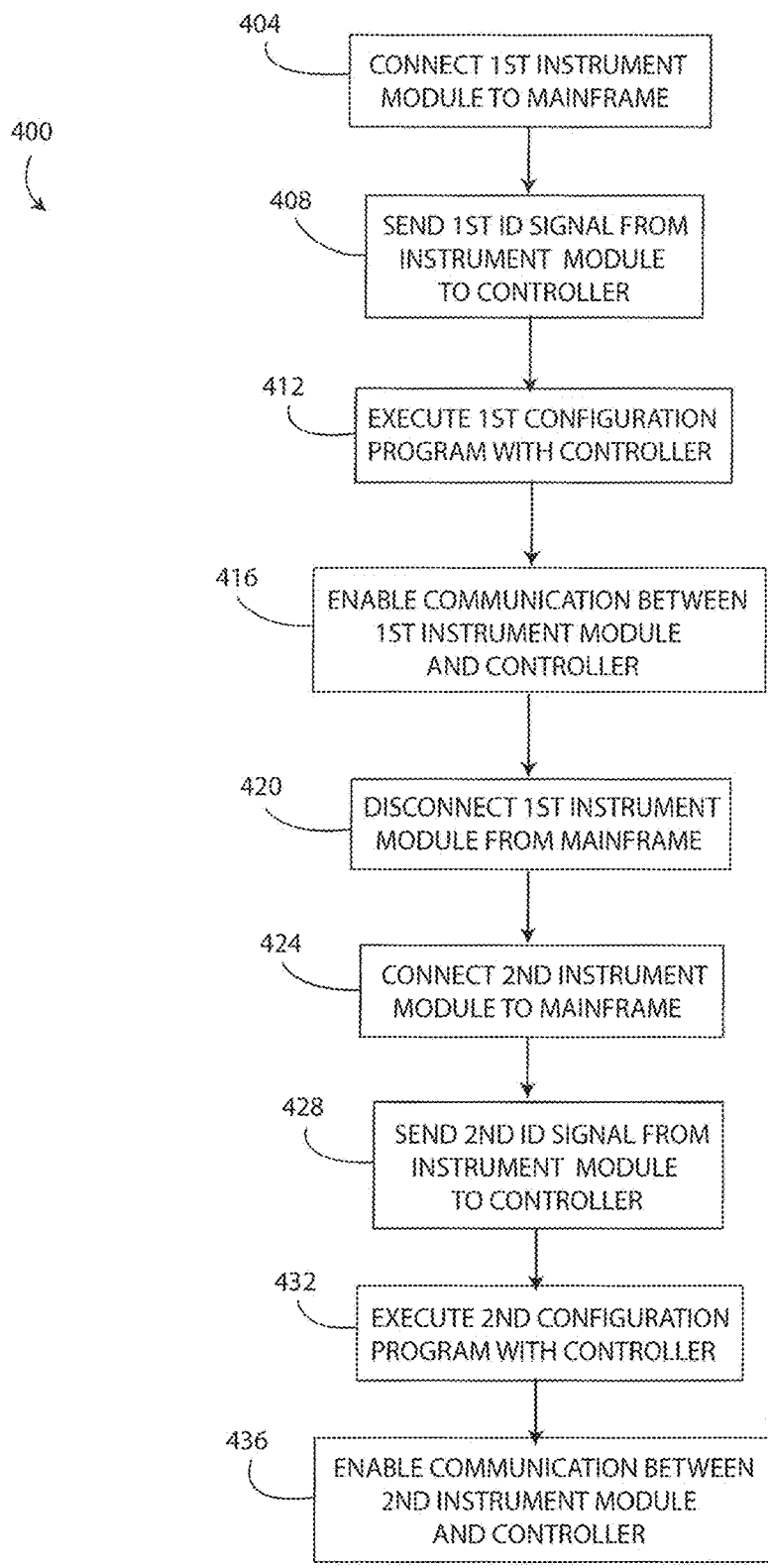
FIG. 4 is a block diagram of an exemplary method of operating the instrumentation system of FIG. 1.

FIG. 4 illustrates a method of operating the instrumentation system 100 of FIGS. 1-3. The method 400 begins with the connecting of a first instrument module 112 to the mainframe 116 (block 404). Connecting the instrument module 112 includes selecting an available slot 186 and sliding the instrument module 112 into the slot 186 until the interface 138 of the instrument module 112 electrically connects to the interface 170 of the controller 128. Electrically connecting the interface 138 to the interface 170 includes electrically connecting the conductors 150 of the interface 138 to the conductors 190 of the interface 170. When the interface 138 is electrically connected to the interface 170, the instrument module 112 receives electrical power from the power supply 182 through the predetermined power conductors 154, 194.

Next, the controller 128 determines the identity of the instrument module 112 that has been connected to the interface 170 (block 408). To determine the identity of the instrument module 112, the controller receives the identification signal generated by the instrument module 112 through the electrically connected predetermined identification conductors 158, 198. The identification signal is an electronic signal that includes data configured to identify the instrument module 112 to the controller 128. When the instrument module 112 is initially connected to the interface 170, the identity of the instrument module 112 is unknown to the controller 128 and, therefore, the controller 128 does not know which configuration program(s) 210 to execute for communication with the instrument module 112. Thus, the identification signal informs the controller 128 of the identity of the instrument module 112 so that controller 128 is able to configure the interface 170 for proper electrical communication with the interface 138 of the instrument module 112.

The instrument module 112 identifies itself to the controller 128 according to any known identification technique. In the embodiment of FIGS. 1-3, the instrument module 112 digitally encrypts the identification signal and transmits the encrypted signal to the controller 128. The controller 128 receives the encrypted signal and decrypts the signal to obtain the identification signal. The identification signal, in this embodiment, is a resistance value that is representative of the identification of the instrument module 112 and is associated with at least one configuration program 210 used by the instrument module 112. The controller 128 uses the resistance value to determine (i) the configuration program(s) 210 used by the instrument module 112, and (ii) the function of each of the conductors 150 of the interface 138 of the instrument module 112, typically with reference to a look-up table stored in the memory 178.

In another embodiment, the instrument module 112 identifies itself to the controller 128 according to a different process. For example, in one embodiment, the instrument module 112 sends the identification signal to the controller 128, and the controller 128 sends the identification signal to the computer 124, which uses the identification to locate a configuration program 210 from a remote source over the computer network 234. The configuration program is sent from the computer 124 to the controller 128, which stores the program in the electronic memory 178 of the controller 128. In another embodiment, the instrument module 112 sends an assignment of the conductors 150 of the interface 138 to the controller 128 along with a request for a specific configuration program 210. In yet another embodiment, the identification signal from an instrument module is used by the controller 128 as an input to a look-up table stored in the memory 178 to obtain data that identifies the correlation of the conductors 150 of the interface 138 with the conductors 190 of the interface 170 connected to the instrument module.

The controller 128 executes the configuration program(s) 210 corresponding to the identification signal (block 412) to enable bi-directional communication between the instrument module 112 and the controller 128 (block 416). Executing the configuration program 210 includes properly configuring the controller 128 to transmit and to receive data from the conductors 150 of the interface 138 of the instrument module 112 through the interface 170 of the controller 128. Executing the configuration program 210 also includes transmitting and receiving data from the instrument module 112 that are associated with the test instrument(s) 104 connected to the instrument module 112. Moreover, executing the configuration program 210 includes transmitting data with the processor 174 from the mainframe 116 to the computer 124 through the data acquisition card 120. For example, in one embodiment, the controller 128 configures the min/max configuration program 210 for use with the instrument module 112. The instrument module 112 generates a data stream from a test instrument 104 and the data stream is sent to the controller 128. The controller 128 processes the data stream through the min/max configuration program 210 to generate a processed data stream. Then, the processor 174 sends the processed stream to the computer 124 through the data acquisition card 120. The process described above and shown in blocks 404 through 416 of the FIG. 4 is carried out for each instrument module 112 received by one of the slots 186 and connected to an interface 170 of the controller 128.

The controller 128 is configurable and re-configurable to operate with any instrument module 112 that is connectable to an interface 170, even instrument models that have not yet been developed. Thus, the controller 128 is referred to as an embedded extensible instrument bus (EXIB). The reconfiguring process begins with disconnecting the instrument module 112 (i.e. the first instrument module) from the mainframe 116 (block 420) and connecting another instrument module 112 (i.e. a second instrument module) to the mainframe 116 that is different from the disconnected first instrument module 112 (block 424). The second instrument module 112 is different from the first instrument module 112 in that the assignment of the conductors 150 of the interface 138 of the second instrument module 112 is different from the assignment of the conductors 150 of the interface 138 of the first instrument module 112 (except for the predetermined power conductor 154 and the predetermined identification conductor 158). The second instrument module 112 also requires a different configuration program 210 than the first instrument module 112. Therefore, the controller 128 would not be configured for proper communication with the second instrument module 112 if the second instrument module 112 was connected to the same interface 170 to which the first instrument module 112 was connected if the configuration program executed by the controller was not changed. Accordingly, the second instrument module 112 sends an identification signal to the controller 128 that is different from the identification signal of the first instrument module 112 (block 428). The controller 128 determines the identity of the second instrument module 112 and determines the configuration program(s) 210 associated with the determined identity. Then, the controller 128 executes the configuration program 210 to reconfigure the interface 170 for proper communication with the second instrument module 112 (block 432), in same manner as described above with regard to the first instrument module 112. Thus, the interface 170 of the controller 128 is automatically reconfigured with reference to the identity of instrument module 112 connected to the mainframe 116.

The instrumentation system 100 is an improvement over past systems in which the assignment of the conductors 150 of the interface 138 of every type of instrument module 112 had the same configuration, or else the mainframe 116 would be unable to communicate with the instrument module 112. For example, if pin 1 of an interface of a prior art controller was configured as an input pin, then any instrument module connected to the interface could use pin 1 only as an input. Whereas, the extensibility of the controller 128 enables the function of the conductors 190 of the interface 170 to be configurable or repartitioned to correspond to any desired function of the instrument module 112. Accordingly, when a new instrument module 112 is developed it does not have to adhere to any predefined interface configuration standard, because the controller 128 is configured to support any configuration of the interface 138 so long as the interfaces 138, 170 are mechanically compatible. Moreover, since the channel driver pins 206 of the controller 128 are configurable, each instrument module 112 does not need to use the channel driver pins 206 in the same manner, thereby potentially reducing the number of used interface conductors 190 and the size and cost of the mainframe 116.

The controller 128 enables cost effective modular configuration of the mainframe 116 without the overhead of traditional expensive bus architectures, which are static and cannot be easily reprogrammed. As described above, the configuration programs 210 associated with the instrument modules 112 are defined in soft IP cores within the controller 128 instead of being based on traditional mini-computer-like bus architectures. Channel driver pins 206 can be re-purposed over time as necessary to support new instrument modules 112. The instrument modules 112 are upgradable using software distribution channels to support future undefined hardware elements, thereby allowing the configuration of individual instrumentation modules 112 to be optimized for size, power consumption, and cost.

Since the interface 170 of the controller 128 does not rely on standard bi-directional data bus architectures, galvanic isolation is much easier to provide. This ease arises from all of the signals on the interface 170 being capable of being defined as unidirectional. Galvanic isolation is highly desirable in instrumentation devices both for safety as well as signal integrity.

Figure 5:
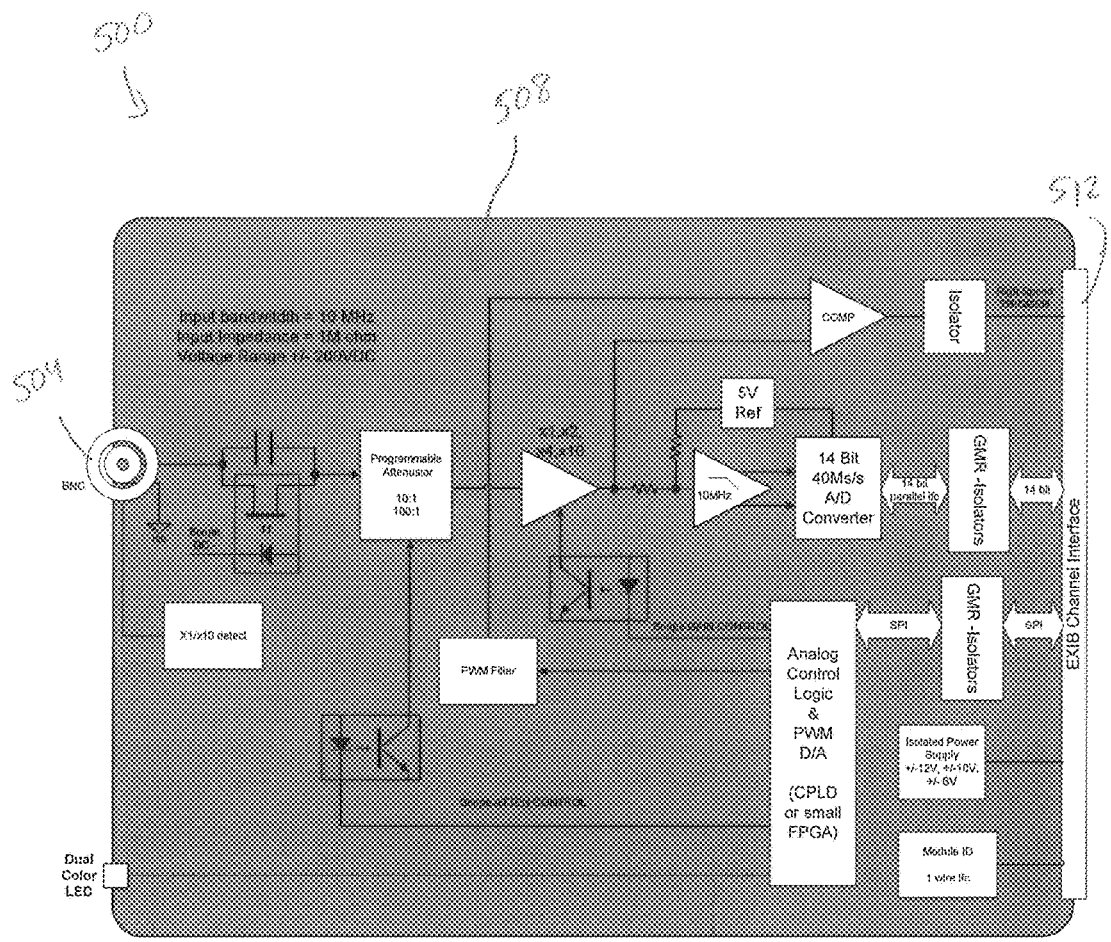
FIG. 5 is a block diagram of an exemplary instrument module for use with the mainframe of FIG. 1, which is shown as an oscilloscope channel.

As shown in FIG. 5, an exemplary instrument module 500 is shown as an oscilloscope channel and includes a data connector 504, processing circuitry 508, and an interface 512. The data connector 504 is shown as a BNC connector that is suitable for connection to an oscilloscope probe (not shown). Data generated by the oscilloscope probe are received by the processing circuitry 508 through the data connector 504. The processing circuitry 508 is configured to process the electronic data generated by the oscilloscope probe and to generate electronic module data. The interface 512 is configured to identify the module as an oscilloscope channel and the controller 128 executes a configuration program 210 that configures the interface 170 of the controller 128 for communication with the oscilloscope module. Accordingly, the instrument module 500 sends the electronic module data to the mainframe 116 through the interface 512.

Figure 6:
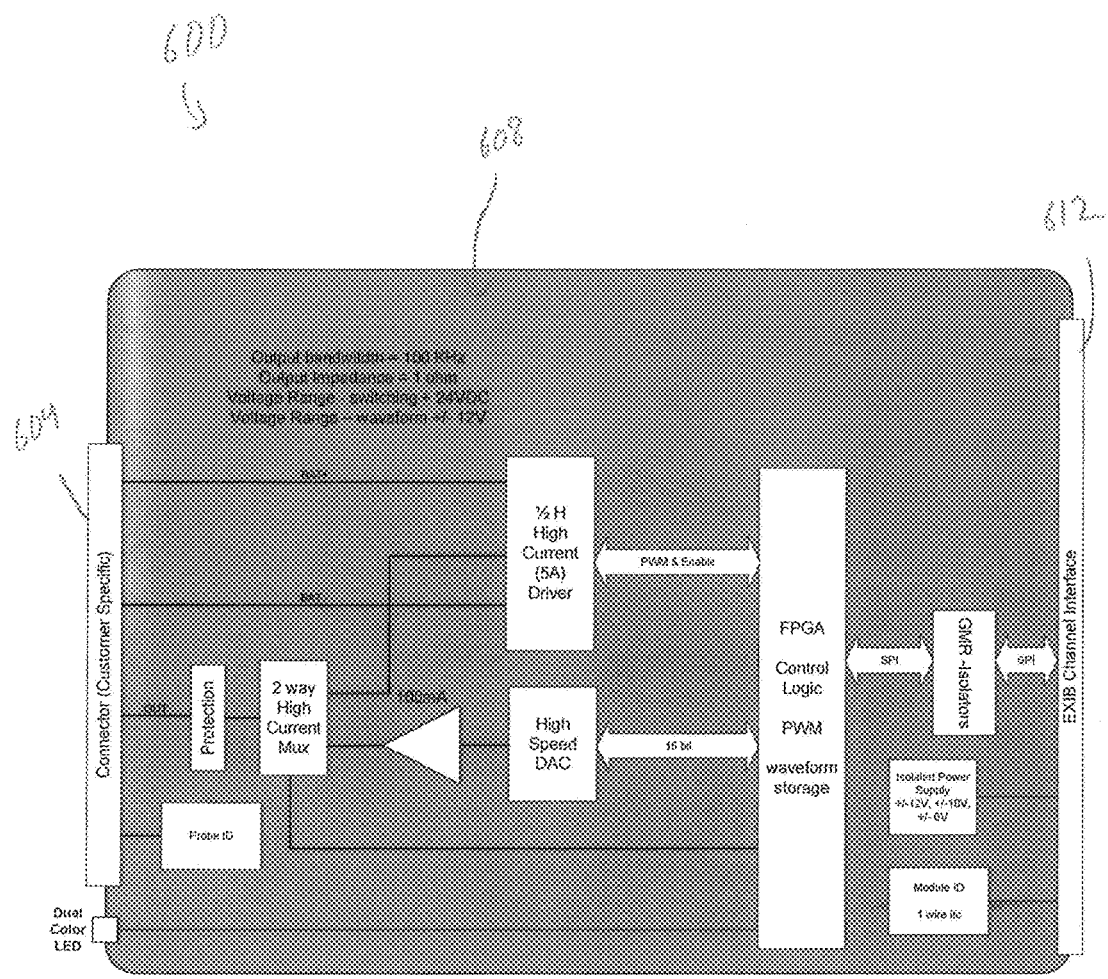
FIG. 6 is a block diagram of another exemplary instrument module for use with the mainframe of FIG. 1, which is shown as an output module.

With reference to FIG. 6, another exemplary instrument module 600 is provided as an output module and includes a data connector 604 (including input and output ports), processing circuitry 608, and an interface 612. The data connector 604 is shown as a proprietary connector that is suitable for connection to a test instrument 104. Data generated by the test instrument 104 are received by the processing circuitry 608 through the data connector 604. The processing circuitry 608 is configured to process the electronic data generated by the test instrument 104 and to generate electronic module data. The interface 612 is configured to identify the module as an output module and the controller 128 executes a configuration program 210 that configures the interface 170 of the controller 128 for communication with the output module. Accordingly, the instrument module 600 sends the electronic module data to the mainframe 116 through interface 612. The configuration of the interface 612 of the instrument module 600 is different from the configuration of the interface 512 of the instrument module 500.

Figure 7:
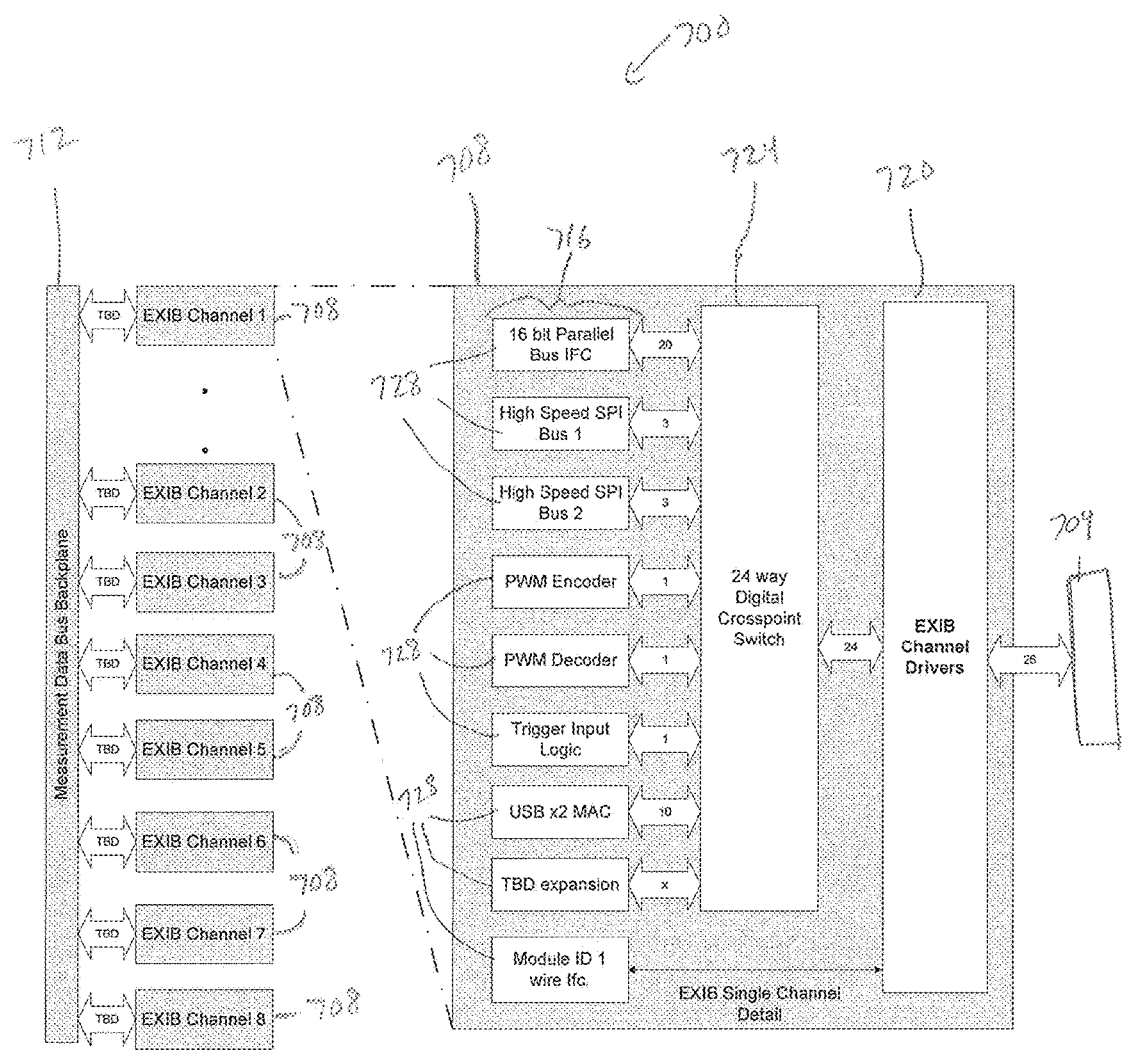
FIG. 7 is a block diagram of another embodiment of a mainframe of the instrumentation system of FIG. 1.

FIG. 7 illustrates a portion of another embodiment of a mainframe 700 including an interface 704, a plurality of controllers 708, and an interface bus 712. The mainframe 700 includes a controller 708 for each interface 704. Thus, the eight channel mainframe 700 of FIG. 7 includes eight interfaces 704 and eight corresponding controllers 708. FIG. 7 shows a detailed view of the controller 708 associated with EXIB Channel 1. The controller 708 includes an FPGA 716, a plurality of channel drivers 720, and a switch unit 724. The channel drivers 720 are electrically connected to the interface 704, which corresponds to the interface 170 of the controller 128 of FIG. 3. The channel drivers 720 consist of serial as well as parallel and discrete elements. The switch unit 724 is a 24 way digital crosspoint switch that includes a plurality of switches that are connected at one end to the twenty-four channel drivers and at the other end to the FPGA 716. The FPGA 716 includes a plurality of configuration programs 728 and is electrically connected to the interface bus 712. The switches of the switch unit 724 are configured to selectively couple signals from predetermined conductors of the interface 704 to inputs and outputs of the FPGA 716 with which a configuration program 728 communicates. The predetermined identification conductor and the predetermined power conductor of the interface 704 do not pass through the switch unit 724. Instead, the predetermined identification conductor is directly connected to an input of the FPGA 716 associated with the module identification configuration program and the predetermined power conductor is directly connected to an output of the electrical power supply in the mainframe 116, typically through an overcurrent protection device. In one embodiment, the controller 708 determines the configuration of the switches in the unit 724 based on the identification signal of an instrument module 112. The switch unit 724 need not be a fully populated matrix, but need only support the configuration programs 728 present in the controller 708 and the instrument module 112 types associated therewith. Accordingly, if an exemplary instrument module 112 requires the 16-bit Parallel Bus IFC configuration program 728 then only twenty of the twenty four available switches are used to electrically connect the FPGA 716 to the interface 704. The switch unit 724 is extendable and upgradable through software updates, as desired, for use with new instrument modules 112. In this embodiment, instead of the instrumentation bus interface being manifested as physical pins, the instrumentation bus is embedded into logic gates of the FPGA of the controller 708.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of configuring a controller for communication with at least one instrument module comprising:
    electrically connecting an interface of the at least one instrument module to an interface of the controller;
    receiving with the controller an identification signal from the interface of the at least one instrument module through a predetermined portion of the interface of the controller, the identification signal corresponding to an identification of the at least one instrument module; and
    executing with the controller a configuration program that corresponds to the identification signal to enable communication between the at least one instrument module and the controller through a remainder of the interface of the controller.

2. The method of configuring the controller of claim 1 further comprising:
    electrically disconnecting the interface of the at least one instrument module from the interface of the controller;
    electrically connecting an interface of another instrument module to the interface of the controller, the other instrument module being different than the at least one instrument module;
    receiving with the controller another identification signal from the interface of the other instrument module through the predetermined portion of the interface of the controller, the other identification signal identifying the other instrument module as being different than the at least one instrument module and the other identification signal corresponding to an identification of the other instrument module; and executing with the controller another configuration program that corresponds to the other identification signal to enable communication between the other instrument module and the controller through the remainder of the interface of the controller.

3. The method of configuring the controller of claim 2 wherein:

the interface of the at least one instrument module includes a first conductor having a first function, the first conductor configured for electrical connection with a corresponding conductor of the interface of the controller, the interface of the other instrument module includes a second conductor having a second function that is different from the first function, the second conductor configured for electrical connection with the corresponding conductor of the interface of the controller, and executing the other configuration program of the other instrument module configures the corresponding conductor of the interface of the controller to switch from the first function to the second function.

4. The method of configuring the controller of claim 1 further comprising:

selecting with the controller the configuration program that corresponds to the identification signal from a plurality of configuration programs stored in an electronic memory operatively connected to the controller.

5. The method of configuring the controller of claim 4 further comprising:

selecting with the controller the configuration program from the electronic memory over a computer network operatively connected to the controller.

6. The method of configuring the controller of claim 1 further comprising:

encrypting with the at least one instrument module a resistance value to form the identification signal;

decrypting with the controller the identification signal to obtain the resistance value; and selecting with the controller the configuration program to execute with reference to the decrypted resistance value.

7. The method of configuring the controller of claim 1 further comprising:

configuring with the controller executing the configuration program a plurality of switches to route signals from predetermined conductors of the remainder of the interface to the controller executing the configuration program.

8. The method of configuring the controller of claim 1 further comprising:

delivering electrical power to the at least one instrument module through a predetermined conductor of the interface to the controller.

9. The method of configuring the controller of claim 1 further comprising:

electrically connecting an interface of another instrument module to another interface to the controller, the other instrument module being different than the at least one instrument module;

receiving with the controller another identification signal from the interface of the other instrument module through a predetermined portion of the other interface to the controller, the other identification signal identifying the other instrument module as being different than the at least one instrument module, and the other identification signal corresponding to an identification of the other instrument module; and executing with the controller another configuration program that corresponds to the other identification signal to enable communication between the other instrument module and the controller through the other interface to the controller through the remainder of the interface of the controller.

10. An instrument system comprising:

at least one instrument module having an interface; and a controller having an interface configured for electrical connection to the interface of the at least one instrument module, the controller being configured to:

receive an identification signal generated by the at least one instrument module and communicated through a predetermined portion of the interface of the controller and the interface of the at least one instrument module; and execute a configuration program that corresponds to the identification signal to enable communication between the at least one instrument module and the controller through a remainder of the interface of the controller and the interface of the at least one instrument module.

11. The instrument system of claim 10, further comprising:

an electronic memory operatively connected to the controller and configured to store a plurality of configuration programs;

the controller being further configured to select the configuration program from the plurality of configuration programs stored in the electronic memory with reference to the identification signal.

12. The instrument system of claim 11 further comprising:

a computer network operatively connected to the electronic memory and to the controller, and the controller is further configured to receive the plurality of configuration programs over the computer network and store the plurality of configuration programs in the electronic memory.

13. The instrument system of claim 11, wherein the at least one instrument module is further configured to encrypt a resistance value to form the identification signal; and the controller is further configured to:

decrypt the identification signal to obtain the resistance value; and select the configuration program from the plurality of configuration programs with reference to the decrypted resistance value.

14. The instrument system of claim 10 further comprising:

a plurality of switches operatively connected between the controller and the interface of the controller; and the controller is further configured to electrically connect predetermined switches of the plurality of switches to enable signals from predetermined conductors of the interface of the controller to the controller.

15. The instrument system of claim 10, the interface of the controller further comprising:

a plurality of electrical conductors, electrical power to the at least one instrument module being provided through a predetermined electrical conductor of the plurality of electrical conductors of the interface of the controller.

16. The instrument system of claim 10 further comprising:

another interface configured for electrical connection to an interface of another instrument module; and the controller being further configured to:
receive another identification signal generated by the other instrument module through a predetermined portion of the other interface of the controller; and
execute another configuration program that corresponds to the other identification signal to enable communication between the other instrument module and the controller through a remainder of the interface of the controller and the interface of the other instrument module.

* * * * *